United States Patent
Janssen et al.

[19]

[11] Patent Number: 5,836,187
[45] Date of Patent: Nov. 17, 1998

[54] TUMBERLESS AUTOMOBILE IGNITION LOCK

[75] Inventors: David C. Janssen, Whitefish Bay; Larry R. Grimmer, Sussex, both of Wis.

[73] Assignee: STRATTEC Security Corporation, Milwaukee, Wis.

[21] Appl. No.: 721,942

[22] Filed: Sep. 27, 1996

Related U.S. Application Data

[63] Continuation of Ser. No. 253,774, Jun. 3, 1994, abandoned.

[51] Int. Cl.⁶ .................................................. E05B 49/00
[52] U.S. Cl. ............................... 70/252; 70/278; 70/386; 70/408
[58] Field of Search ........................... 70/276–283, 413, 70/408, 386, 252, 389

[56] References Cited

U.S. PATENT DOCUMENTS

| | | | |
|---|---|---|---|
| 1,114,709 | 10/1914 | Müler | 70/493 |
| 2,613,258 | 10/1952 | Azano | 70/DIG. 30 X |
| 3,689,885 | 9/1972 | Kaplan et al. | 340/152 |
| 3,732,465 | 5/1973 | Palmer | 317/134 |
| 3,752,960 | 8/1973 | Walton | 235/61.11 H |
| 3,764,859 | 10/1973 | Wood et al. | 70/278 X |
| 3,787,812 | 1/1974 | Armstrong | 70/278 X |
| 3,859,624 | 1/1975 | Kriofsky et al. | 340/38 L |
| 3,964,024 | 6/1976 | Hutton et al. | 340/152 T |
| 4,189,712 | 2/1980 | Lemelson | 340/149 A |
| 4,192,400 | 3/1980 | McEwan | 180/287 |
| 4,200,227 | 4/1980 | Lemelson | 235/382 |
| 4,250,533 | 2/1981 | Nelson | 361/172 |
| 4,262,632 | 4/1981 | Hanton et al. | 119/1 |
| 4,267,494 | 5/1981 | Matsuoka et al. | 318/568 |
| 4,291,237 | 9/1981 | Kitano | 307/10 AT |
| 4,297,569 | 10/1981 | Flies | 235/443 |
| 4,298,792 | 11/1981 | Granholm et al. | 235/375 |
| 4,327,353 | 4/1982 | Beard et al. | 340/64 |
| 4,337,462 | 6/1982 | Lemelson | 340/572 |
| 4,361,153 | 11/1982 | Slocum et al. | 128/419 P |
| 4,366,466 | 12/1982 | Lutz | 340/64 |
| 4,415,893 | 11/1983 | Roland | 340/825.31 |
| 4,435,649 | 3/1984 | Vandigriff | 307/10 AT |
| 4,471,343 | 9/1984 | Lemelson | 340/571 |
| 4,532,932 | 8/1985 | Batty, Jr. | 128/631 |
| 4,602,253 | 7/1986 | Kreft | 340/825.31 |
| 4,663,952 | 5/1987 | Gelhard | 70/278 |
| 4,738,334 | 4/1988 | Weishaupt | 180/287 |
| 4,848,115 | 7/1989 | Clarkson et al. | 70/278 X |
| 4,854,146 | 8/1989 | O'Connell et al. | 70/493 X |
| 4,868,409 | 9/1989 | Tanaka et al. | 70/278 X |
| 5,003,801 | 4/1991 | Stinar et al. | 70/278 |
| 5,005,393 | 4/1991 | Ewalds et al. | 70/277 |
| 5,012,236 | 4/1991 | Troyk et al. | 340/825.54 |
| 5,084,699 | 1/1992 | DeMichele | 340/825.54 |
| 5,095,309 | 3/1992 | Troyk et al. | 340/825.54 |
| 5,117,097 | 5/1992 | Kimura et al. | 70/278 X |
| 5,121,102 | 6/1992 | Stricklin, Jr. | 340/521 |
| 5,195,341 | 3/1993 | Neiuwkoop | 70/278 |
| 5,289,706 | 3/1994 | Krebs et al. | 70/252 |
| 5,337,588 | 8/1994 | Chhatwal | 70/278 |

FOREIGN PATENT DOCUMENTS

| | | | |
|---|---|---|---|
| 0355475 | 2/1990 | European Pat. Off. | |
| 0388997 | 9/1990 | European Pat. Off. | |
| 0475616 | 3/1992 | European Pat. Off. | |
| 3940061 | 6/1991 | Germany | 292/DIG. 38 |
| 4317119 | 11/1994 | Germany | |
| WO84/04128 | 10/1984 | WIPO | |
| WO86/03797 | 7/1986 | WIPO | 70/278 |
| WO88/00635 | 1/1988 | WIPO | 70/278 |

*Primary Examiner*—Lloyd A. Gall
*Attorney, Agent, or Firm*—Reinhart, Boerner, Van Deuren, Norris & Rieselbach, s.c.

[57] ABSTRACT

An electronic interlock system for a tumberless lock which utilizes radio frequency identification to enable system operation. The interlock system includes a reader which powers an antenna to generate an electromagnetic field which in turn energizes a small transponder mounted in the key. The transponder transmits a unique identification code back to the reader via the antenna where it is decoded, and if valid enables system operation, but if invalid prevents operation. The antenna is mounted at the forward end of the lock assembly. A unique key retention system and cylinder anti-rotation lock system is also disclosed.

2 Claims, 6 Drawing Sheets

TUMBERLESS AUTOMOBILE IGNITION LOCK

This application is a continuation of Ser. No. 08/253,774, filed Jun. 3, 1994, and which is now abandoned.

BACKGROUND OF THE INVENTION

The present invention relates to locks, and more particularly to a lock for the ignition circuit of an automobile.

Various types of locks for use in connection with the ignition circuit of an automobile are known in the art. Many of such locks include anti-theft and/or anti-tampering mechanisms which are incorporated to deter unauthorized use of automobiles. Increasingly popular with the automotive industry is an electronic interlock operating in connection with the automobile ignition lock. An electronic interlock system uses a coded activation signal to enable starting of the automobile in conjunction with the mechanical lock. Presently, the coded activation signal is read either electronically or optically within the ignition lock, and is subsequently sent to an electronic control module which controls engine operation. Hence, an electronic interlock does not allow the lock to be bypassed or "hot wired", or pulled in order to start the automobile. As a result, automobile theft is more time consuming and difficult.

The keys employed with an electronic interlock system contain both mechanical and electronic interlock codes. For example, one electronic interlock system utilizes an electrical resistance coded within the ignition system. This electrical resistance may be in the form of a pellet containing a resistor having a precoded resistance which is mounted in the key. Upon turning the key, the electrical resistance of the resistor contained within the pellet is read and decoded. If correct, an activation signal is generated and the control module allows the automobile to start. Examples of such interlock systems and keys for use therewith are illustrated in U.S. Pat. Nos. 4,250,482, 5,083,362, and 5,156,032.

In another electronic interlock system, an optical code is employed to control engine operation. Currently, optical codes are in the form of a plurality of hole combinations physically formed in the key. The optical code is formed by utilizing a combination of large and small holes, read by a reader, and subsequently converted into an electronic activation signal if the hole combination of the key being employed in the ignition lock is correct. The activation signal is then sent to the electronic control module of the engine to enable ignition. As a result, a key having an erroneous hole combination will neither enable the ignition system nor start the automobile.

In both of the above instances, the ignition key provides a mechanical code in the form of bits or notches formed in the key shank which when correctly matching the tumblers contained within the lock releases the lock as well as an electronic code which must also match a precoded activation code in order to allow the ignition system to fully engage. These types of locking systems and the associated keys are designed specifically to conceal the electronic interlock code and to make decoding the lock system difficult. Although such devices are effective for their intended purpose, there remains a need for improved electronic interlock devices of this type. In particular, since the mechanical key code repeatedly contacts tumblers within the lock, it is subject to wear, dirt and other mechanical problems. It would therefore be desirable to develop a contactless transmission of coded information which is tamperproof, free of wear and totally non-intrusive.

SUMMARY OF THE INVENTION

The present invention provides an electronic interlock system for a tumblerless mechanical lock, preferably an automobile ignition lock, to enable or disable operation. The electronic interlock includes a key having a unique identification code which is transmitted from the key to a control module. Transmission occurs either through a radio frequency identification (RFID) system or a touch memory digital interface system.

An RFID interlock system consists of a reader which sends a power signal to an antenna which in turn generates an electro-magnetic field. This field energizes a small transponder mounted in the key, which in turn transmits a unique identification code back to the reader via the antenna where it is decoded. If the signal sent by the transponder is a valid identification code the reader transmits this information to an electronic control module which in turn enables operation. However, if the signal is invalid, the reader transmits this information to the electronic control module which then prevents operation. Typically, the antenna generates an RF field which is received by a coil in the transponder, converted to DC voltage and used to supply the transponder's electronic circuitry. The transponder's circuitry in turn transmits its unique identification code in the form of a low energy electro-magnetic RF field which is received by the antenna and is in turn decoded by the reader as described above.

A touch memory digital interface system employs a semiconductor memory chip containing a unique programmed digital code in the key. Once the key is inserted within the lock, a host control module stimulates the memory chip which in turn transmits its unique digital code to the control module. If the digital code is valid, the control module enables operation.

One aspect of the invention relates to a cylinder, sleeve and key arrangement that emulates the actions and interfaces of a standard mechanically actuated ignition lock, except that there are no tumblers locking the cylinder to the sleeve. Only the electronic interlock is utilized to unlock the ignition. Also, the key optionally has no mechanical code in the form of bits or notches. Thus any key with an appropriate shank configuration that conforms to the key hole in the cylinder will enable the cylinder to rotate within the sleeve. The key, cylinder and sleeve may each be composed of a plastic material, a metallic material, or a combination of such materials.

As with a standard ignition lock, the key would be inserted into a key hole and the cylinder would be rotated. As the lock is rotated it would energize the automobile's interface module, which in turn would activate either the RFID reader or the host control module. The RFID reader would energize the antenna, which would in turn energize the passive transponder. Upon being energized, the transponder would transmit its unique digital code modulated on an RF signal. The modulated signal would be picked up by the antenna and transmitted to the reader. The code would then be forwarded to the automobile's interface module, which would verify it. If the code proved valid, the automobile would be allowed to start. Typically RFID transponders have unique codes with billions of combinations available.

The antenna is preferably located at the forward end of the lock assembly, i.e. adjacent the key opening, and more preferably is spaced slightly forward of the key opening. In one embodiment, the antenna is carried by an annular plastic ring or module which is either staked or friction fit on either the lock sleeve or the lock housing depending upon the particular lock assembly being utilized. The antenna may be wound in an annular recess formed in the module or may be integrally molded therein. In this first embodiment, the antenna essentially surrounds the cylinder and forms an opening which is coaxial with the cylinder. In another embodiment, the antenna is wound in a manner similar to a coil spring and is located along the external surface of the lock sleeve or lock housing depending once again upon the particular lock assembly application. In this second embodiment, the longitudinal axis of the antenna is eccentric to and parallel with the longitudinal axis of the cylinder. The antenna of this embodiment may be located circumferentially at any desired location about the lock sleeve or lock housing depending upon clearances or other considerations. In yet another embodiment of the invention, the antenna may be integrally molded within the lock sleeve itself. In this case, of course, the lock sleeve is composed of a plastic material.

Another aspect of the invention involves the lock's key retention system. The key retention system consists of three major elements, namely, a key retainer pin, the inner surface of the sleeve, and a retainer slot formed in the key shank. As the key is inserted, the top of the key retainer pin raises into a cavity formed in the inner surface of the sleeve. When the key is fully inserted, the key retainer pin drops into the key's retainer slot with the motivating force being exerted by the spring loaded key minder switch plunger and is flush with the outer surface of the cylinder to permit rotation of the cylinder. When the key is rotated from the off-lock position the inner surface of the sleeve will not allow the key retainer pin to rise, and thus the key retainer pin will not lift out of the key's retainer slot when an attempt is made to remove the key to thus prevent key removal.

Yet another aspect of the invention relates to the cylinder lock system that prevents the cylinder from turning when no key is inserted. There are three major components, namely, the key minder switch plunger, they key retainer pin and a ball bearing. When there is no key in the lock, the key minder switch plunger motivates the key retainer pin to the bottom of a key retainer pocket formed in the cylinder via the ball bearing. When an attempt is made to rotate the lock, the ball bearing acts to block the rotation. The ball bearing is preferably located at least half way below the top of the sleeve cavity.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENTS

Figure 1:
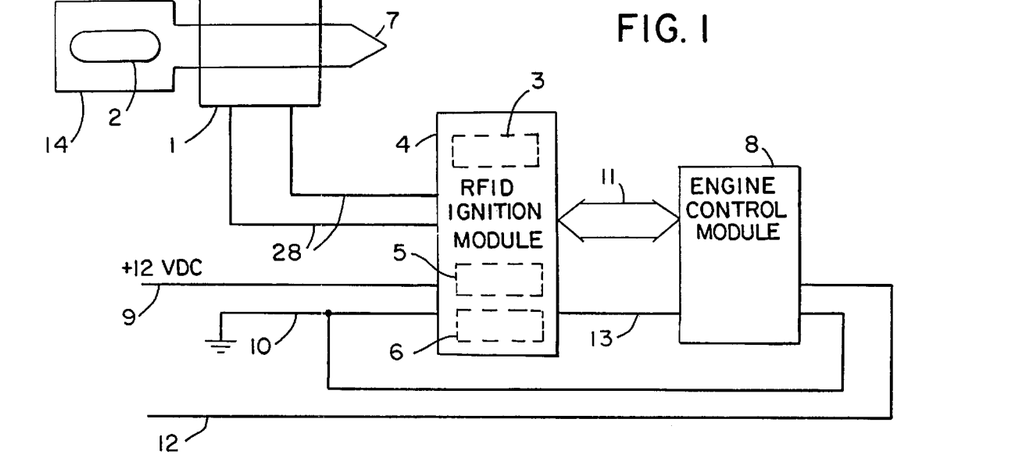
FIG. 1 is a schematic block diagram of an RFID electronic interlock system for an automobile ignition lock.

Referring now to the drawings, FIG. 1 illustrates the basic concept of the RFID electronic interlock of the present invention. Although illustrated in the environment of an automobile ignition lock the electronic interlock could be utilized to replace other types of mechanical locks.

There are three major components of the RFID interlock, namely, an antenna 1, a transponder 2 and an RFID ignition module 4 containing a reader 3. Reader 3 is contained within an RFID ignition module 4 along with a logic circuit 5 and a control circuit 6. More specifically, the present invention includes an antenna 1 in the form of a wire coil which generates an RF electromagnetic field in response to a RF power signal generated by reader 3. This RF electromagnetic field energizes transponder 2 contained in key 7, which in turn transmits a unique RF identification code or signal back to reader 3 via antenna 1. Reader 3 then translates the ID code into a digital form and forwards the digital ID code to logic circuit 5 which verifies that the ID signal is a valid ID signal. If the signal received is valid, logic circuit 5 sends an activation signal to control circuit 6 which in turn sends an enable signal to engine control module 8 which in turn controls engine operation, e.g. fuel injection, ignition spark, etc. If the ID signal is invalid, logic circuit 5 sends a reject signal to control circuit 6. Power for the system is received from the automobile battery (not shown) via line 9, and line 10 is a common ground for the modules 4 and 8. Buss 11 permits data transfer between modules 4 and 8. Finally, line 12 communicates with the ignition switch (not shown) which enables control module 8 to turn RFID ignition module 4 on and/or off via line 13 upon rotating key 7 to the "run" position of the automobile ignition circuit.

The transponder 2 is mounted in head 14 of key 7 and consists of an approximately 3.8 by 22 millimeter glass encapsulated transponder such as that available from Texas Instruments under Model No. RI-TRP-RRHP-06. Reader 3 may also incorporate two coils, an exciter coil and a receiving coil, such as the type available from Hughes Identification Devices under Model No. HS51051 hand held reader.

When the automobile is to be started, key 7 is inserted into the keyway of the ignition lock and turned to close the ignition switch. Battery voltage is thus applied to engine control module 8 which turns on RFID ignition module 4 causing reader 3 to send out a 134.2 KHz power pulse to antenna 1 lasting approximately 50 milliseconds. Antenna 1 thus generates a radio frequency field. This field is received by a coil or antenna (not shown) in transponder 2 that is tuned to the same frequency, and converted to DC voltage by a rectifier (not shown). This DC voltage is then regulated down, stored in a small capacitor within the transponder 2 and used to supply the transponder's electronic circuitry. When the power pulse has finished, the transponder's circuitry immediately transmits back a signal that carries the data that is stored within the transponder 2, using the energy stored within its capacitor as the power source. The data is a unique factory programmed 64 bit identification code. This circuitry transmits the identification code using frequency shift keying (FSK) on a low energy electro magnetic RF field. The ID signal sent by transponder 2 is thus received by antenna 1 and is in turn decoded by reader 3 by translating the FSK RF signal to a digital ID code and sending the digital code to logic circuit 5. The digital signal is then verified as a valid ID code which in turn will enable engine operation or an invalid ID code which will prevent engine operation. Once all data has been sent the storage capacitor within transponder 2 is discharged, thereby resetting the transponder 2 to make it ready for the next read cycle. The total read cycle lasts about 120 milliseconds.

Referring now to FIGS. 2–5, there is illustrated a first embodiment of a tumblerless lock with antenna 1 mounted at the forward end of an automobile ignition lock. The ignition lock includes a hollow cylindrical sleeve 15 which in turn is fixed within another hollow generally cylindrical sleeve or lock housing 16. Housing 16 may, for example, comprise a steering column of an automobile although it is within the scope of the present invention to mount the lock in any desired location.

Figures 4, 5, 6, 7:
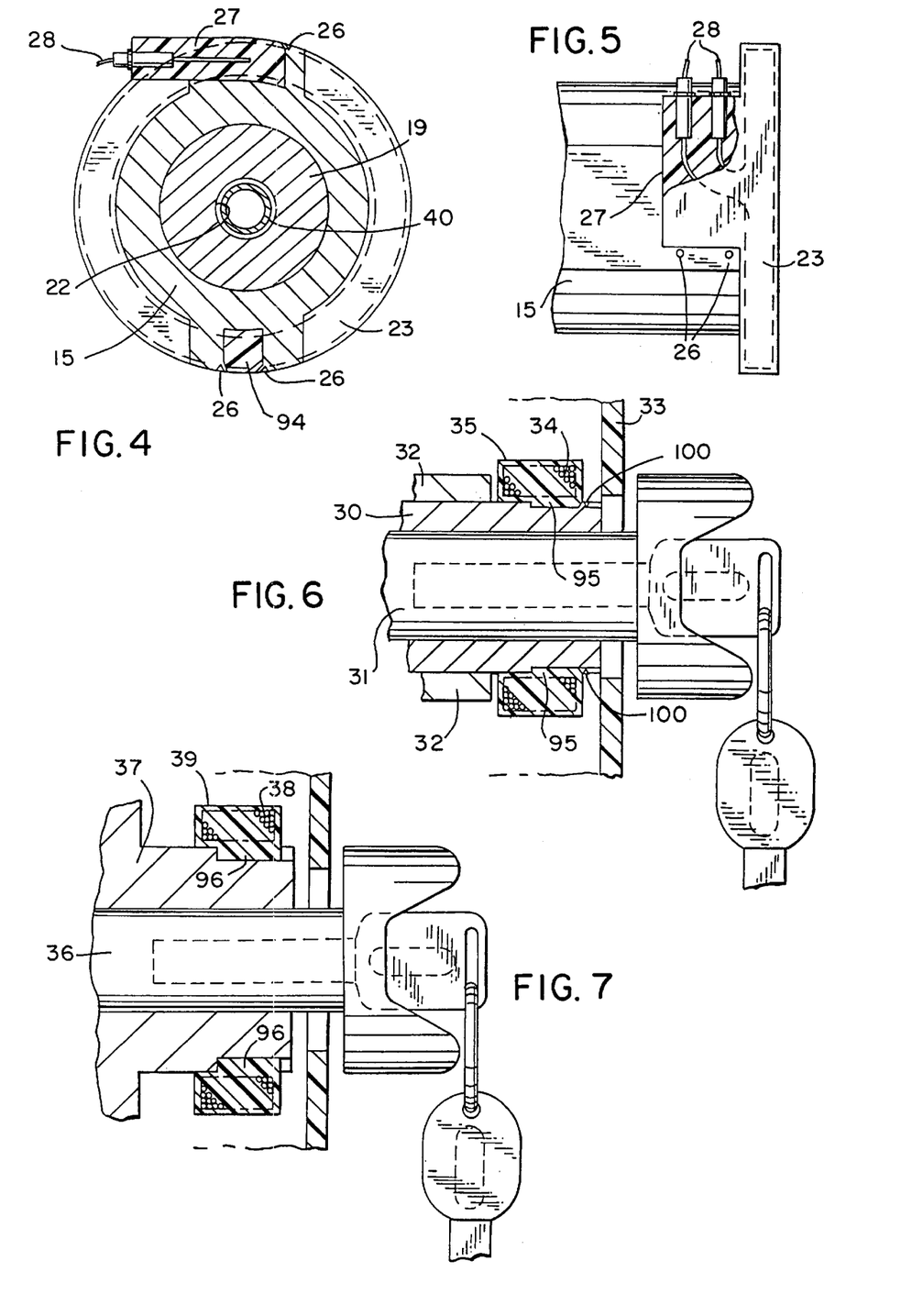
FIG. 4 is a cross-section view taken along the plane of the line 4—4 in FIG. 3.
FIG. 5 is a top view of the ignition lock of FIG. 2 with parts broken away and in section.
FIG. 6 is a sectional view of a second embodiment of the invention illustrating the antenna mounted on the lock sleeve.
FIG. 7 is a view similar to FIG. 6 of a third embodiment of the invention showing the antenna mounted on the lock housing.

Sleeve 15 includes a cylindrical outer surface 17 and a cylindrical inner surface 18 which receives an elongated rotatable cylinder 19 therein. The cylinder 19 and sleeves 15 and 16 comprise a "lock element" as used in this description and in the claims. As shown, the rearward end of cylinder 19 is to the left in FIG. 3 while the forward end of cylinder 19 is to the right in FIG. 3 adjacent wall 29 of the steering column housing. Cylinder 19 includes a cylindrical outer surface 20 which forms a rotational interface with inner surface 18 of sleeve 15. Cylinder 19 is rotatable about longitudinal axis 21, and includes a key hole or keyway 22 along the axis 21 for receiving key 40 therein. Cylinder 19 is rotatable by key 40 between an off position and a start position when cylinder 19 is rotated in a clockwise direction as shown in FIG. 4. After starting, cylinder 19 rotates in a counterclockwise direction from the start position to a run position, as is conventional. As shown best in FIG. 4, cylinder 19 does not include any axially spaced tumblers and there are no bits or notches on key 40. The shank of key 40 is cylindrically shaped although other configurations such as blade-shaped may also be employed. It should also be noted, however, that although key 40 is illustrated without notches, some applications may require key 40 to contain notches. For example, some automobiles may utilize a conventional lock with tumblers for the doors or trunk and a tumblerless lock for the ignition. In such a case key 40 would have notches in its shank used to open these secondary locks. These notches, of course would be superfluous in the ignition lock disclosed herein.

Figures 2, 3:
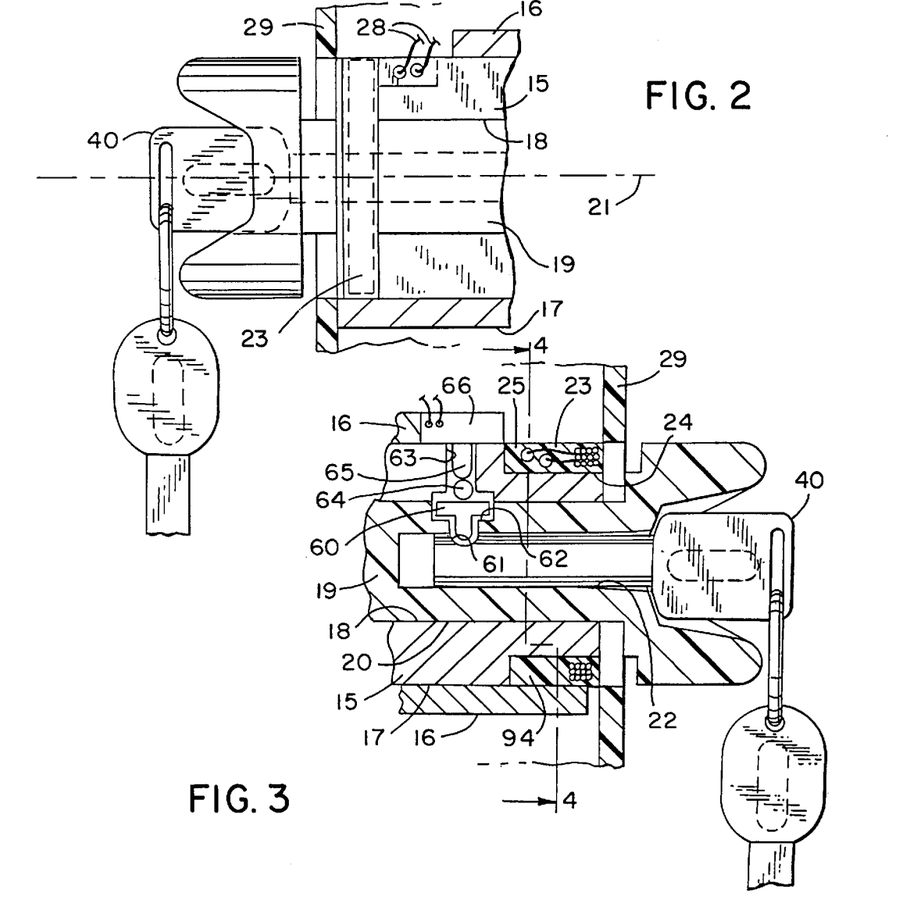
FIG. 2 is a fragmentary side view of a tumblerless automobile ignition lock incorporating a first embodiment of the electronic interlock system of FIG. 1.
FIG. 3 is a cross-sectional side view of the lock of FIG. 2.

The key retention system includes three components, namely, a key retainer pin 60, the inner surface 18 of sleeve 15 and a retainer slot 61. Pin 60 is substantially T-shaped and slides radially in a corresponding T-shaped pocket 62 formed in cylinder 19. A T-shaped cavity 63 is formed coincidentally with pocket 62 inside of sleeve 15 for receiving a ball bearing 64 and a spring biased plunger 65 of a key minder switch 66. As the key 40 is inserted, the head of the key retainer pin 60 moves radially outwardly into cavity 63. When key 40 is fully inserted, the key retainer pin 60 drops into the key's retainer slot 61 with the motivating force being exerted by the spring loaded key minder switch plunger 65. Once engaged with slot 61 the head of pin 60 is flush with outer surface 20 of cylinder 19. Thereafter, when key 40 is rotated clockwise from the off-lock position the inner surface 18 of sleeve 15 engages the head of pin 60 and will not allow pin 60 to move radially. Thus, pin 60 cannot rise out of slot 61 when an attempt is made to remove key 40 in other than the off-lock position.

The lock shown in FIG. 3 also includes a cylinder lock system for preventing cylinder 19 from turning when no key is installed. The cylinder lock system includes key minder switch plunger 65, key retainer pin 60 and ball bearing 64. When there is no key in key hole 22, spring loaded plunger 65 biases pin 60 radially inwardly to the bottom of pocket 62 via ball bearing 64. Ball bearing 64 is thus located along the interface between inner surface 18 of sleeve 15 and outer surface 20 of cylinder 19. Ball bearing 64 is preferably located at least half way below the bottom of sleeve cavity 63. Thus, when an attempt is made to rotate cylinder 19 without key 40, ball bearing 64 acts to block the rotation.

As shown best in FIGS. 3 and 5, antenna 1 is integrally contained within an annular module 23. Antenna 1 is located at the forward end of module 23 and thereby also at the forward end of sleeve 15 and cylinder 19. This location for antenna 1 provides a desirable position to avoid interference with the electro magnetic field emminating from antenna 1 by the metallic composition of sleeve 15 and cylinder 19. Thus, as shown best in FIGS. 3 and 4, when assembled on sleeve 15 the wire of antenna 1 is wrapped about sleeve 15 and cylinder 19 to thus form an annular coil having a central opening which is coaxial with longitudinal axis 21. Module 23 is in the form of an annular ring that may have an inner diameter formed by the inner circumferential surface 24 which is dimensioned to provide a mechanical fit or mechanical attachment with the outer surface 17 of sleeve 15. Thus, module 23 may be slid over the forward end of sleeve 15 and received within and fixedly mounted in a recess 25 formed in sleeve 15. Alternately, and as shown in FIGS. 4 and 5, module 23 may be staked at 26 to insure that it is integrally mounted on sleeve 15. To insure module 23 does not rotate with respect to sleeve 15, an anti-rotation element or tooth 94 projects therefrom and is received within a corresponding opening in sleeve 15. As shown best in FIGS. 4 and 5, module 23 also includes a harness connection 27 which extends transversely with respect to axis 21 and is utilized to connect antenna 1 with module 4 via wires 28 (see FIG. 1). Although module 23 is attached to the lock sleeve it is within the scope of the invention to attach the module to the lock housing.

FIG. 6 shows a second embodiment of the present invention wherein the ignition lock includes a sleeve 30, rotatable cylinder 31 received therein as well as lock housing 32 and steering column wall 33 all functioning in the manner described with respect to FIGS. 2–5. FIG. 6, however, illustrates an antenna 34 in the form of a wire coil which is contained within an annular ring or module 35 which has an inner diameter dimensioned to be substantially the same as the outer diameter of sleeve 30. Module 35 thus is mounted on sleeve 30 solely via a friction fit. Module 35 may also include an anti-rotation element such as teeth 95 projecting into sleeve 30. As an alternative, the anti-rotation means may comprise a flat (not shown) on the inner surface of module 35. Module 35 is preferably composed of a plastic material and coil 34 is "potted" therein with a plastic material such as epoxy. The coil 34 could also be insert molded within module 35. Module 35 may also be retained by staking as at 100.

FIG. 7 illustrates a third embodiment of the present invention similar to FIG. 6 except that a cylinder 36 rotates directly within lock housing 37. As shown, the lock sleeve has been eliminated from this embodiment. As with the second embodiment of FIG. 6, antenna 38 in the third embodiment of FIG. 7 is contained within an annular module or ring 39 which is mechanically attached to the external surface of housing 37. Module 39 may also include an anti-rotation element such as teeth 96 projecting into housing 37.

Figure 8:
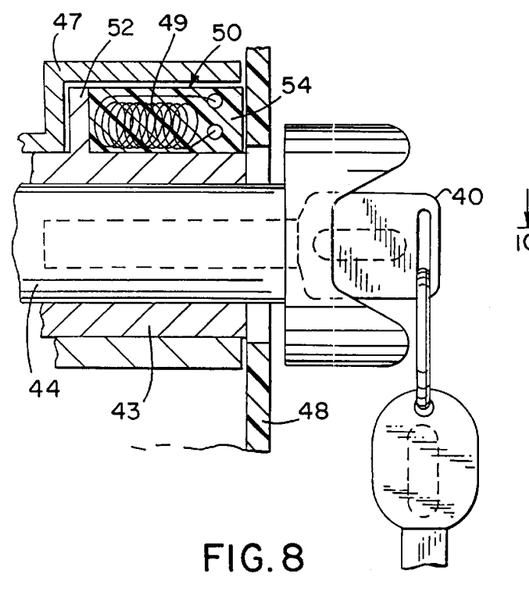
FIG. 8 is a cross-sectional side view similar to FIGS. 3 and 6 illustrating a fourth embodiment of the invention wherein the antenna is coiled longitudinally along the external surface of the lock sleeve.
Figure 9:
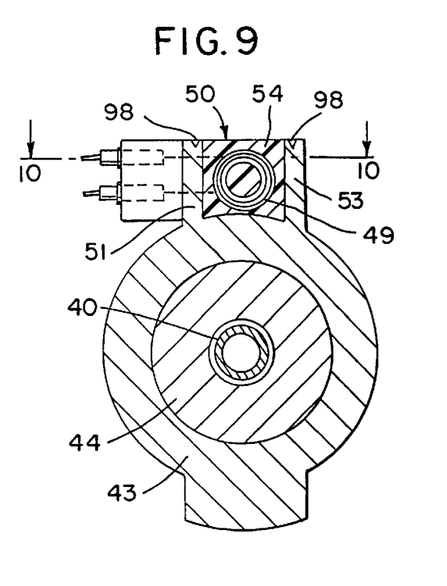
FIG. 9 is a cross-sectional view taken along the plane of the lines 9—9 in FIG. 10.
Figure 10:
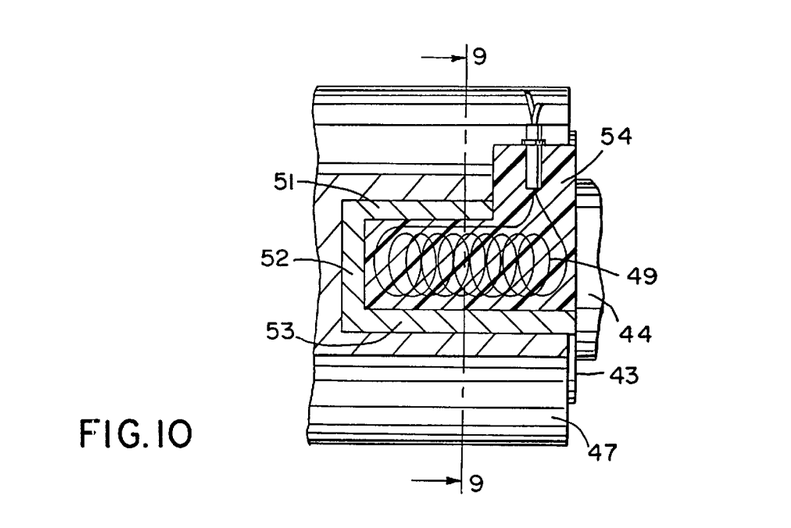
FIG. 10 is a cross-sectional view taken along the plane of the line 10—10 in FIG. 9.

Referring now to FIGS. 8–10, there is illustrated a fourth embodiment of the present invention. In this embodiment, the ignition lock includes a sleeve 43, rotatable tumblerless cylinder 44 received therein as well as lock housing wall 47 and steering column wall 48 all functioning in a conventional manner and as previously described herein. FIGS. 8–10, however, illustrate an antenna 49 in the form of a wire coil which is located along the external surface of the lock sleeve 43 in a manner similar to a coil spring. As best shown in FIG. 9, the longitudinal axis of antenna 49 is eccentric to and parallel with the longitudinal axis of cylinder 44 instead of being wrapped completely around cylinder 44 and disposed coaxially therewith as in the previous embodiments. Antenna 49 is contained within a module 50 which is attached to the outer surface of sleeve 43. Antenna 49 is insert molded within a plastic material 54 to form module 50 which in turn is received within a housing comprised of three walls 51–53 projecting from the outer surface of sleeve 43. Module 50 is then mechanically attached to the projecting housing by staking, as at 98.

Figure 11:
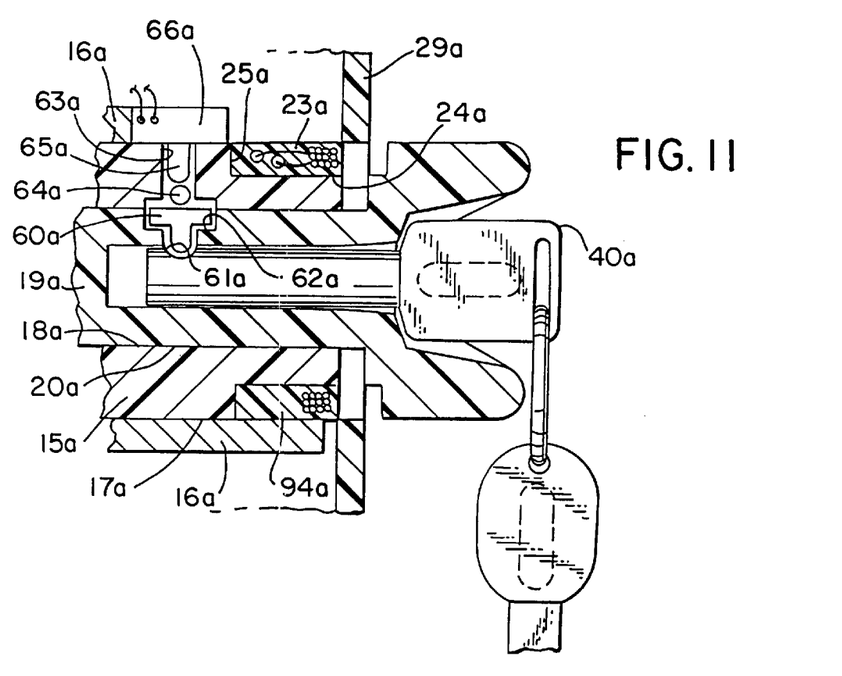
FIG. 11 is a cross sectional side view of a fifth embodiment of the present invention similar to FIG. 3 except illustrating each of the cylinder, sleeve and key composed of a plastic material.

FIG. 11 illustrates a fifth embodiment of the present invention. As the structure of the components and the functions of those components illustrated in FIG. 11 are identical to FIG. 3 the same reference numerals are employed except for the addition of the letter "a" thereafter. Reference is also made to the description herein with respect to FIG. 3. FIG. 11, however, illustrates an "all plastic" embodiment where key 40a, cylinder 19a and sleeve 15a are all composed of a plastic material.

Figure 12:
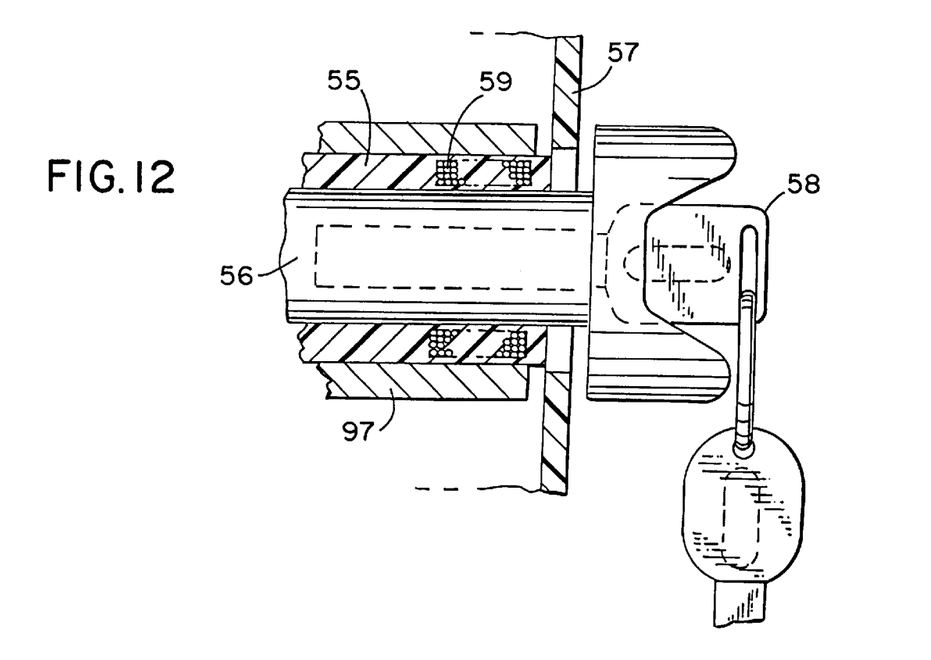
FIG. 12 is a cross-sectional side view of a sixth embodiment of the present invention illustrating the antenna integrally molded within a plastic lock sleeve.

FIG. 12 illustrates a sixth embodiment of the present invention wherein once again the ignition lock includes a sleeve 55 which receives an elongated rotatable cylinder 56 therein both mounted within steering column wall 57 and operable by a key 58 as previously described herein. FIG. 12, however, illustrates sleeve 55 being composed of a plastic material rather than metal which thus enables antenna 59 in the form of a wire coil to be integrally contained therein. Thus, sleeve 55 functions as the "module" for mounting the antenna 59 so that a separate component for mounting antenna 59 is eliminated. It should also be noted that although FIG. 12 illustrates antenna 59 as being integrally molded within sleeve 55, antenna 59 could also be integrally molded within housing 97. Housing 97 would, in such a case, be composed of a plastic material.

Figure 13:
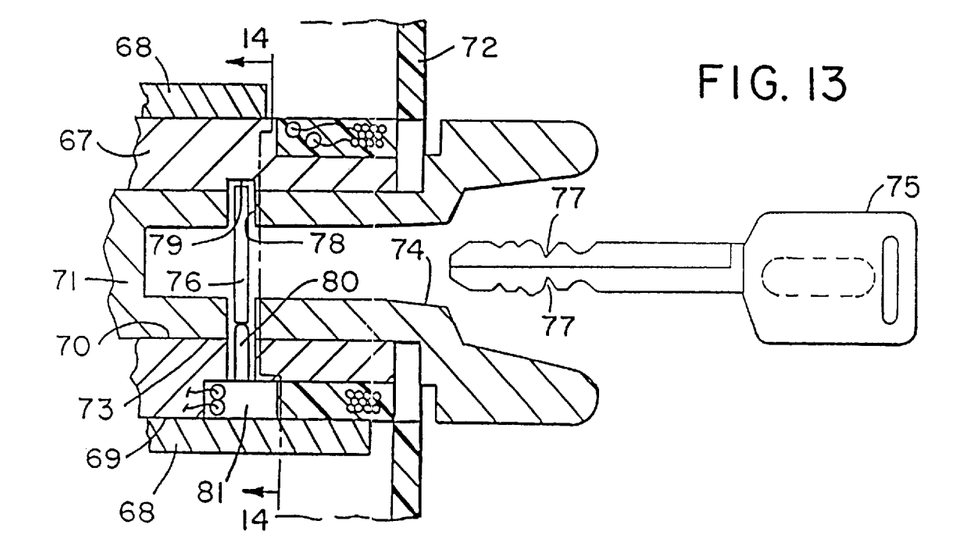
FIG. 13 is a cross-sectional side view similar to FIG. 3 except illustrating an alternate key retention system and cylinder anti-rotation lock system.
Figure 14:
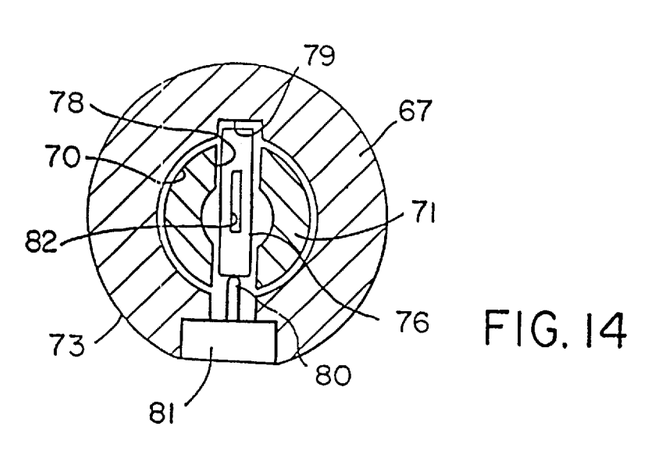
FIG. 14 is a fragmentary cross-section view taken along the plane of the line 14—14 in FIG. 13.

Referring now to FIGS. 13–14, there is illustrated a seventh embodiment of a tumblerless lock with an alternate key retention system and anti-rotation lock system. The ignition lock includes a hollow cylindrical sleeve 67 which in turn is fixed within another hollow generally cylindrical sleeve or lock housing 68. Housing 68 may, for example, comprise a steering column of an automobile although it is within the scope of the present invention to mount the lock in any desired location.

Sleeve 67 includes a cylindrical outer surface 69 and a cylindrical inner surface 70 which receives an elongated rotatable cylinder 71 therein. The cylinder 71 and sleeves 67 and 68 comprise the "lock element" as used in this description and in the claims. As shown, the rearward end of cylinder 71 is to the left in FIG. 13 while the forward end of cylinder 71 is to the right in FIG. 13 adjacent wall 72 of the steering column housing. Cylinder 71 includes a cylindrical outer surface 73 which forms a rotational interface with inner surface 70 of sleeve 67. Cylinder 71 is rotatable about its longitudinal axis, and includes a key hole or keyway 74 along the axis for receiving key 75 therein. Cylinder 71 is rotatable by key 75 between an off position and a start position when cylinder 71 is rotated in a clockwise direction from the position shown in FIG. 14. After starting, cylinder 71 rotates in a counterclockwise direction from start position to a run position, as is conventional. As shown best in FIG. 14, cylinder 71 does not include any axially spaced conventional cylinder locking tumblers. The shank of key 75 is blade shaped although other configurations may also be employed.

The key retention system includes three components, namely, a key retainer pin 76, the inner surface 70 of sleeve 67 and a retainer slot 77 formed in the shank of key 75. Pin 76 is substantially flat with a central opening 82 matching the key shank configuration and slides radially in a corresponding pocket 78 formed in cylinder 71. A cavity 79 is formed coincidentally with pocket 78 inside of sleeve 67 for receiving the tip of pin 76. A spring biased plunger 80 of a key minder switch 81 normally urges pin 76 upwardly in FIG. 13 into sleeve 67 when key 75 is not present. As the key 75 is inserted it engages the lower edge of opening 82 and pulls pin 76 downwardly against the force of plunger 80 so that the tip of pin 76 is disengaged from cavity 79. When key 75 is fully inserted, the key retainer pin 76 drops into the key's retainer slot 77 with the motivating force being exerted by the spring loaded key minder switch plunger 80. Once engaged with slot 77 the tip of pin 76 is flush with outer surface 73 of cylinder 71. Thereafter, when key 75 is rotated clockwise from the off-lock position the inner surface 70 of sleeve 67 engages the tip of pin 76 and will not allow pin 76 to move radially. Thus, pin 76 cannot rise out of slot 77 when an attempt is made to remove key 75 in other than the off-lock position.

The lock shown in FIG. 13 also includes a cylinder lock system for preventing cylinder 71 from turning when no key is installed. The cylinder lock system includes key minder switch plunger 80, key retainer pin 76 and pocket 78. When there is no key in key hole 74, spring loaded plunger 80 biases pin 76 radially outwardly into cavity 79. Thus, when an attempt is made to rotate cylinder 71 without key 75 the tip of pin 76 and the edge of cavity 79 blocks the rotation.

Figure 15:
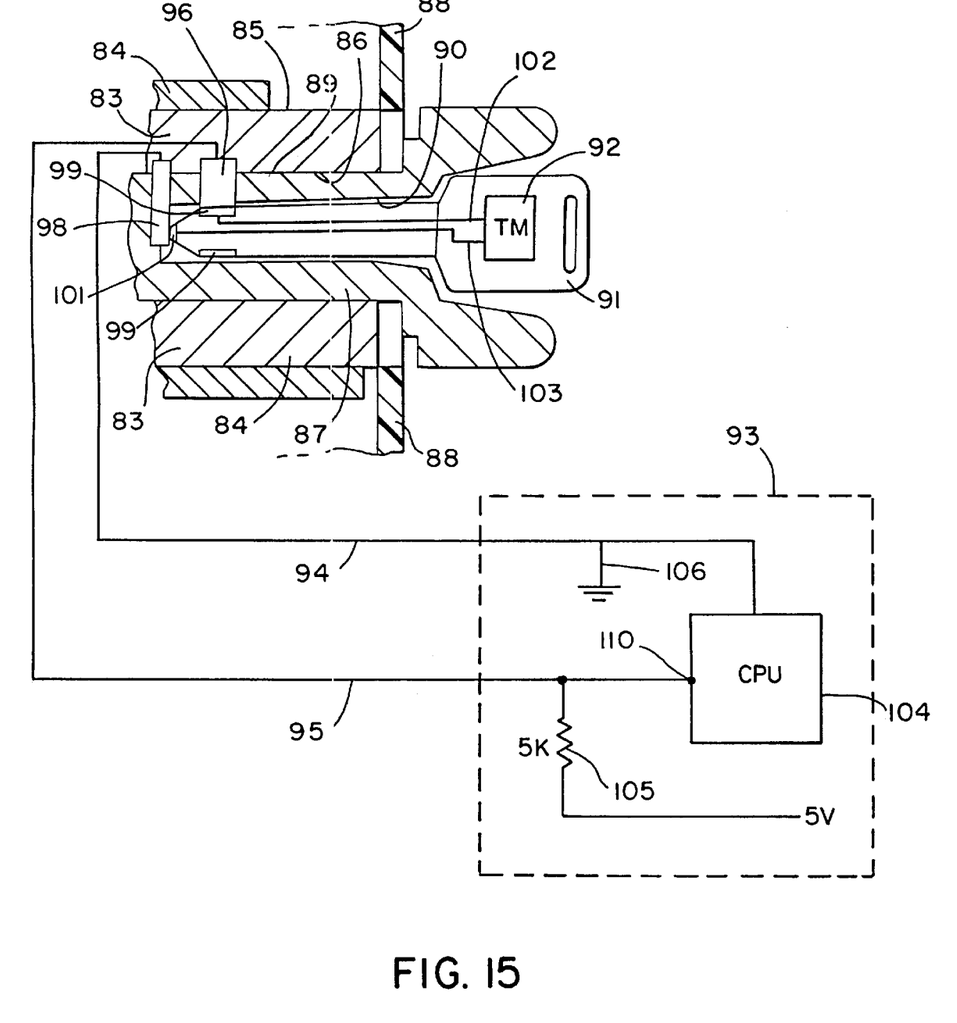
FIG. 15 is a cross-sectional side view of a seventh embodiment illustrating a touch memory digital interface system.

Referring now to FIG. 15, there is illustrated a seventh embodiment of a tumblerless lock illustrating a touch memory digital interface system. The ignition lock includes a hollow cylindrical sleeve 83 which in turn is fixed within another hollow generally cylindrical sleeve or lock housing 84. Housing 84 may, for example, comprise a steering column of an automobile although it is within the scope of the present invention to mount the lock in any desired location.

Sleeve 83 includes a cylindrical outer surface 85 and a cylindrical inner surface 86 which receives an elongated rotatable cylinder 87 therein. The cylinder 87 and sleeves 83 and 84 comprise the "lock element" as used in this description and in the claims. As shown, the rearward end of cylinder 87 is to the left in FIG. 15 while the forward end of cylinder 87 is to the right in FIG. 15 adjacent wall 88 of the steering column housing. Cylinder 87 includes a cylindrical outer surface 89 which forms a rotational interface with inner surface 86 of sleeve 83. Cylinder 87 is rotatable about its longitudinal axis, and includes a key hole or keyway 90 for receiving a key 91 therein. Cylinder 87 is rotatable by key 91 between an off position and a start position when cylinder 87 is rotated in a clockwise direction from the position shown in FIG. 15. After starting, cylinder 87 rotates in a counterclockwise direction from the start position to a run position, as is conventional. As is shown in FIG. 15, cylinder 87 does not include any axially spaced tumblers and there are no bits or notches on key 91. The shank of key 91 is blade shaped although other configurations such as a cylindrical shape may also be employed. It should also be noted, however, that although key 91 is illustrated without notches, some applications may require key 91 to contain notches. For example, some automobiles may utilize a conventional lock with tumblers for the doors or trunk and a tumblerless lock for the ignition. In such a case, key 91 would have notches in its shank used to open these secondary locks. These notches, of course, would be superfluous in the ignition lock disclosed herein.

The touch memory digital interface system illustrated in FIG. 15 employs a semiconductor touch memory chip 92 containing a unique programmed digital code. Chip 92 is available from Dallas Semiconductor of Dallas, Tex. under part No. DS1990, and is mounted in any conventional manner in the head of key 91. Chip 92 uses electronic long and short pulses to encode binary data, i.e. its unique digital code, and communicates with a reader 93 via lines 94 and 95. In order to accomplish this, sleeve 83 includes a contact 96 located along the top of key hole 90 as well as a second contact 98 located at the end of key hole 90. As shown, contact 98 communicates via line 94 with reader 93 and contact 96 communicates via line 95 with reader 93. Accordingly, key 91 has a corresponding contact 99 in the shape of a collar surrounding the outer end of its shank for respective sliding engagement with contact 96. Also, the tip of key 91 includes a contact 101 for engagement with contact 98. Collar 99 communicates via line 102 with chip 92 while contact 101 communicates via line 103 with chip 92. Reader 93 includes a host microcontroller 104 having an I/O pin 110 which is driven by a 5 volt source through a 5 k ohm resistor 105. Microcontroller 104 is grounded via line 106. In operation, once key 91 is inserted within key hole 90 so that contacts 99 and 101 engage contacts 96 and 98 chip 92 is driven by the 5 volt source to transmit its encoded pulses, i.e. its unique digital code, to host microcontroller 104. This is accomplished by utilizing a FET within touch memory chip 92 so that when the chip memory turns on the FET the host microcontroller reads low at the I/O pin via ground line 106. However, when the FET is turned off, the host microcontroller 104 reads high at the I/O pin since it senses the 5 volt source. If the digital code is valid, i.e. the pulses emitted by the chip's memory matches the code within microcontroller 104, microcontroller 104 enables engine operation through the engine control module. On the other hand, if the digital code is incorrect, ignition is not enabled.

It should specifically be noted that, although not shown in FIG. 15, the key retention system and cylinder lock system previously described herein could be employed with the touch memory system of FIG. 15, if desired. Also a key minder switch could be employed depending upon the desired application.

It should be particularly noted that although the present invention is illustrated herein in the environment of an ignition lock, it may also be employed with other types of locks such as automobile door locks, automobile trunk locks and automobile glove box locks. Also, the invention may be employed with non-automotive locks to limit and/or control access to only authorized personnel.

I claim:

1. A lock system comprising:

a lock assembly including a stationary sleeve, the sleeve having a radial recess therein;

a lock cylinder mounted within the sleeve for rotation between first and second positions, the lock cylinder having a keyway;

a key adapted to be inserted into the keyway and then turned to rotate the lock cylinder between the first and second positions;

a blocking structure including a cylinder lock member and a ball bearing located in the recess in the sleeve with one end of the cylinder lock member extending into the keyway, the cylinder lock member being adapted to be moved radially relative to the lock cylinder and the sleeve in response to the insertion of the key into the keyway, permitting rotation of the lock cylinder by the key, the cylinder lock member engaging the inner surface of the sleeve when the lock cylinder is in a position other than the first position to prevent the removal of the key from the keyway; and a key minder for sensing the presence of a key in the keyway, the key minder including a switch and a movable plunger for actuating the switch, the plunger extending within the radial recess in axial alignment with the cylinder lock member and being biased to a non-actuating position, the plunger being moved by the blocking structure to an actuating position in response to movement of the blocking structure upon insertion of the key into the keyway; and an interlock circuit including a transponder mounted on the key, the transponder being enabled when the lock cylinder is rotated to the second position for generating a coded signal; and a reader responsive to the coded signal for controlling a control circuit.

2. The lock system according to claim 1, wherein the reader is activated in response to the rotation of the lock cylinder from the first position to the second position for supplying a power signal to the transponder for enabling the transponder to generate the coded signal.

* * * * *